Oct. 18, 1966  J. SCHICK  3,279,782
SPRING SYSTEM FOR VEHICLES
Filed March 5, 1964
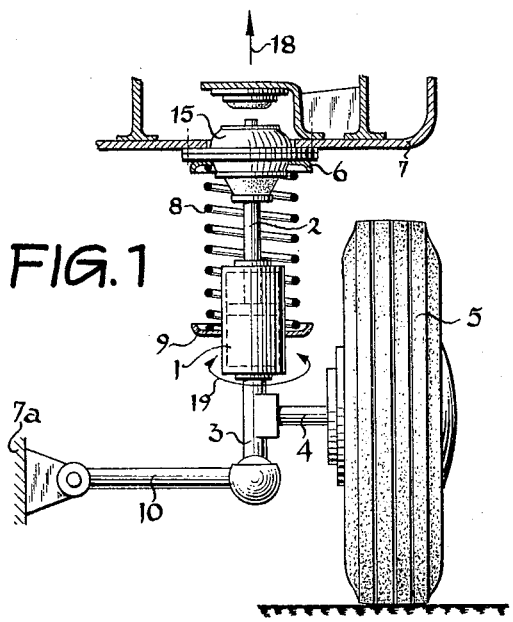
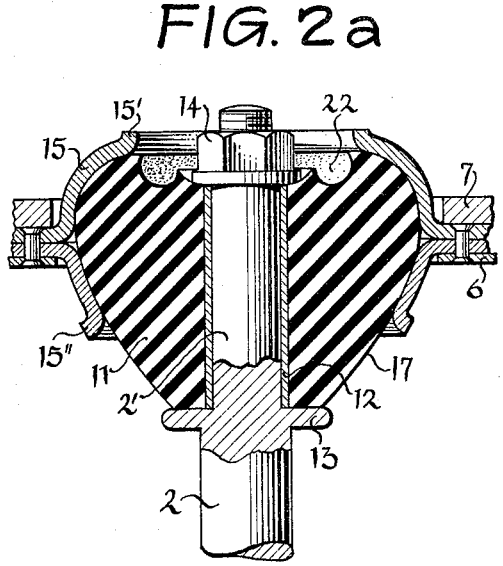
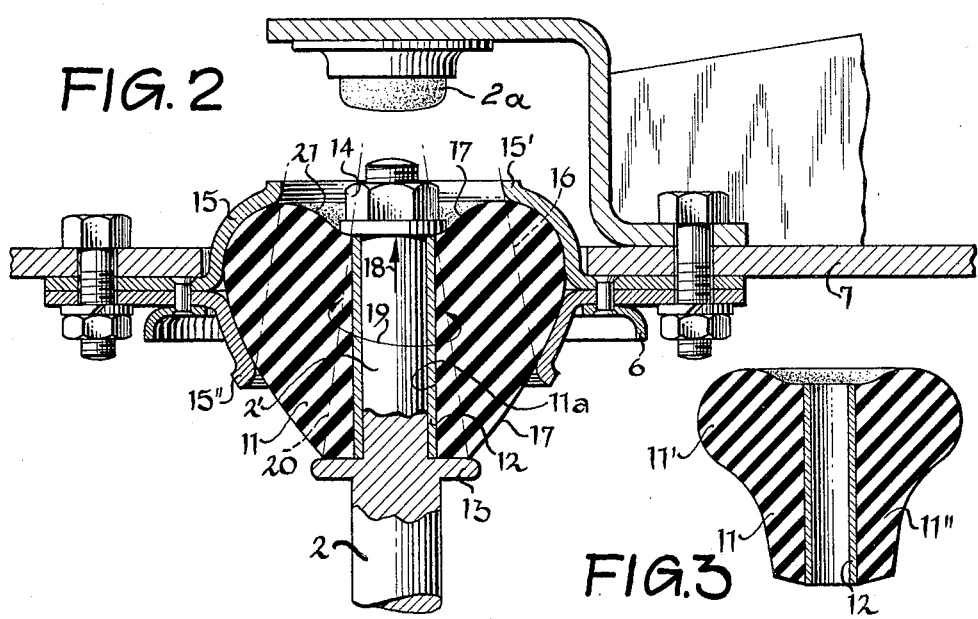
INVENTOR
Joachim Schick
BY United States Patent Office 3,279,782
Patented Oct. 18, 1966

3,279,782
SPRING SYSTEM FOR VEHICLES
Joachim Schick, Hannover, Germany, assignor to Continental Gummi-Werke Aktiengesellschaft, Hannover, Germany
Filed Mar. 5, 1964, Ser. No. 349,630
Claims priority, application Germany, Mar. 7, 1963, C 29,322
6 Claims. (Cl. 267—33)

The present invention relates to a spring system for vehicles, and, more specifically, concerns a vehicle spring system in which the supports for the axles of the steered wheels are connected to the lower portion of a shock absorber which in its turn has its lower end linked to a transverse link, while its upper end is rotatably and in axial direction elastically journalled on the vehicle understructure, a rubbed body arranged coaxially with regard to said shock absorber being interposed between said upper end and said vehicle understructure.

The present invention is directed particularly to the elastic journalling of the upper end of said shock absorber.

It is an object of the present invention to provide a spring system for a vehicle, in which the upper end of the shock absorber employed in connection therewith will be journalled in the vehicle understructure in a simple but safe and elastic manner, so as to permit a sufficient and satisfactory rotatable elastic and elastically yieldable movement in axial direction of the shock absorber.

It is an object of this invention to provide a vehicle spring system as set forth in the preceding paragraph, in which a rubber body is used in connection with the shock absorber, and in which the said rubber body when subjected to stress in axial direction of the shock absorber will undergo such a pressure thrust deformation as to assure a favorable progressive spring rate or spring characteristic.

These and other objects and advantages of the invention will appear more clearly from the following specification in connection with the accompanying drawing, in which:

FIGURE 1 diagrammatically illustrates a vehicle spring system with a wheel linked thereto, as seen in the driving direction of the vehicle;

FIGURE 2, on a larger scale than FIG. 1, illustrates the elastic mounting of the spring leg on the vehicle understructure while employing a shock absorber;

FIG. 2a is a section similar to that of FIG. 2 but differs therefrom in the shape of the recess at the upper portion of the spring or rubber body.

FIGURE 3 shows on a scale different from that of FIG. 2, a section through the rubber body employed for the elastic mounting or journalling of the spring system, said rubber body being shown in not-yet-installed condition, i.e. in non-deformed condition.

According to the present invention, the rubber body when in installed condition, has a substantially heart-shaped cross-section, while that end portion of the rubber body which has the greater diameter, faces the vehicle understructure, engages the same, and is clamped thereagainst. The heart-shaped cross-section of the rubber body makes possible, on one hand, a safe connection by clamping against the vehicle understructure, while on the other hand, this cross-sectional shape brings about the pressure thrust deformation of the rubber spring body which is desired when the spring system carries out a spring action.

In connection with the present invention, it is particularly advantageous to provide that portion of the rubber body through which the shock absorber end extends, with an inner sleeve vulcanized thereto whereby a simple connection with the shock absorber will be made possible.

Furthermore, the rubber body may advantageously also be so installed that it is under a pre-load in radial direction. The rubber body is subjected to this pre-load when the respective portions pertaining thereto are tightened to the vehicle understructure.

Referring now to the drawing in detail, the arrangement shown therein comprises a shock absorber cylinder 1 with a piston rod 2 and a downwardly directed extension 3. These members form a spring leg to which, below the shock absorber cylinder 1, there is connected an axle support 4 for the steered vehicle wheel 5. The upper end of the said spring leg rests through the intervention of a dish 6 against the upper vehicle understructure portion 7. Dish 6 form a bearing for a helical spring 8 arranged axially with regard to said spring leg. The lower end of the spring 8 rests through the intervention of a further dish 9 on the shock absorber cylinder 1. The lower end of the spring leg or extension 3 is by means of a transverse link 10 connected to the lower vehicle understructure part 7a.

The upper bearing means for the spring leg is formed by a rubber body 11 in the form of a body of revolution. The said rubber body 11 has a central bore 11a therethrough through which extends a metal bushing 12 vulcanized thereto. The lower end face of rubber body 11 and of bushing 12 rests on a collar 13 of rod 2. Bushing 12 is held in its position by nut 14 threadedly engaging the upper end of the extension 2'. Connected to the vehicle understructure part 7 are tensioning or clamping elements 15 which are so dimensioned that they can engage the upper range 11' of the rubber body 11 and can pre-load the rubber body 11 in axial direction when said clamping body is tightened in conformity with the showing of FIG. 2. As will be evident from FIGS. 2 and 3, by means of the clamping body 15, it is possible to deform the spring body 11 from its FIG. 3 to its FIG. 2 shape whereby the lower conical portion 11″ and in particular the upper bead-like portion 11′ of spring body 11, will be deformed.

Of particular importance is furthermore the shape of the clamping body 15 in connection with the heart-shaped cross-sectional shape of the rubber body 11 which is illustrated in FIG. 2 as being under a static load, i.e. the ordinary axle load of wheel 5. The free edges 15′ of the clamping body are so arranged that an imaginary connecting line 16 interconnecting the free edges 15′ and 15″ is at an incline with regard to the central axis of rod 2 in such a way that the distance of said line 16 from said central axis decreases in upward direction. In view of the arched shape of the clamping body 15 and its positive engagement with the rubber body 11, this rubber or spring body 11 will have an effective cross-section confined by the adhering surface of bushing 12, the free outer surfaces 17, and the dash-line 16. In view of the inclined location of line 16, a so-to-speak wedging effect will be obtained. When rubber body 11 is subjected to an axial load in the direction of the arrow 18, the rubber body will within the range of its effective cross-section be deformed by pressure and thrust forces. As a result thereof, a desired gradual hardening will be obtained when the wheel 5 or the spring leg is subjected to a spring action.

Furthermore, rubber body 11 will permit rotatable elastic movements in the direction of the double arrow 19 when the wheel 5 is turned to one or the other side. The radial pre-load of rubber body 11 is of particular importance for a rotatable elastic movement in the direction of the arrow 19, because even with greater turning or torsion deformations of rubber body 11, the said radial pre-load will maintain the power flow between the rubber body 11 on one hand, and the clamping body 15 on the other hand.

The cross-sectional shape of the rubber body 11 according to FIG. 2 may also be compared with the contour of the wings of wing-nuts.

In order to limit the relative movements of rod 2 with regard to the clamping body 15 in a direction counter to the direction of the arrow 18, after a certain stroke of rod 2 relative to clamping body 15 has been obtained, it is possible to provide corresponding abutments. Such abutment is represented by way of example in FIG. 2 by the member 2a. Furthermore, the edges 15' are preferably rounded so that the rubber body 11, when correspondingly deformed, may progressively engage the rounded edge or edges 15' which may be correspondingly angled, if so desired. Also, the edges of the collar 13 may be correspondingly rounded.

For the sake of completeness, it may be added that the collar 13 is of partciular importance because it aids in giving the rubber body 11 a cross-sectional range which is favorable for the stress to which the rubber body 11 is subjected. Line 20 which extends substantially parallel to line 16 and determined by the collar 13, indicates the practically effective inner surface of the rubber body 11.

In connection with the present invention, it is furthermore advantageous to relieve the upper free surface 21 of the rubber body. This may be obtained in two ways, which may also be employed together, if it should be desired. In the upper range of the rubber body 11, i.e. within the range of the marginal chamfer forming surface 21, the rubber body 11 may be pre-loaded radially to such an extent that this pressure pre-load will for all practical purposes not be eliminated during a spring action of the spring system. It is also possible to provide annular grooves 22 which likewise provide a relief of rubber body 11 within the marginal zone of surface 21. A modification with such groove 22, which may be completely circular or composed of segmental sections, is shown in FIG. 2a.

It is, of course, to be understood that the present invention is, by no means, limited to the particular constructions shown in the drawings, but also comprises any modifications within the scope of the appended claims.

What I claim is:

1. In combination with a vehicle understructure having a first understructure part and a second understructure part spaced from said first understructure part: a shock absorber comprising a fist member in the form of a cylinder and also comprising a second member in the form of a piston and piston rod connected thereto and cooperaing with said cylinder, a rubber body mounted on one end of and substantially coaxially with one of said members and secured to said first understructure part so as to yield elastically to permit relative axial and rotary movements of said one member on said first understructure part, the other one of said members having an extension directed downwardly in axial direction of said shock absorber and provided with supporting means for a wheel axle, link means arranged in a direction substantially transverse to the longitudinal axis of said shock absorber and having one of its ends universally linked to said extension and having its other end pivotally connected to said second understructure part, said rubber body when under a static load having a substantially heart-shaped cross-section and having that end thereof which has the greater diameter facing said first understructure part, and clamping means clamping the greater diameter end of said rubber body and being connected to said first understructure part for securing said rubber body to said first under structure part.

2. An arrangement according to claim 1, in which said rubber body is radially compressed by said clamping means.

3. An arrangement according to claim 1, in which said clamping means comprises an upper clamping member substantially coaxially arranged with regard to said shock absorber and having first opening and also comprises a second clamping member arranged below said first clamping member and substantially coaxially with regard to said shock absorber and having a second opening, said second opening having a diameter greater than the diameter of said first opening.

4. An arrangement according to claim 1, in which said rubber body has a portion of its upper end face provided with an annular groove.

5. An arrangement according to claim 4, in which said rubber body is radially under pre-load to such an extent that when said rubber body yields the said pre-load will be substantially maintained.

6. In combination with a vehicle understructure having a first understructure part and a second understructure part arranged at a level lower than that of said first understructure part; a shock absorber comprising a first member in the form of a cylinder and also comprising a second member in the form of a piston and piston rod connected thereto and cooperating with said cylinder, a substantially heart-shaped rubber body arranged at one end of and substantially coaxially with one of said members, said one member having a collar supporting said rubber body, clamping means compressing said rubber body and connecting the same to said first understructure part, said clamping means comprising an upper clamping member connected to said first understructure part and arranged substantially coaxially with said shock absorber and having its upper end provided with a first opening, said clamping means also comprising a second clamping member arranged below said first clamping member and substantially coaxially with said shock absorber, said second clamping member having a second opening arranged at the bottom thereof and substantially coaxial with said first opening, said second opening having a greater diameter than said first opening so that connecting lines between the wall surfaces of said first and second openings confine a truncated cone, the diameter of said collar being such that connecting lines from the outer periphery of said collar to the outer periphery of the upper end of said one member confine a truncated cone with the outer walls thereof nearly parallel to the outer wall of said first mentioned truncated cone, the other one of said shock absorber members having an extension directed downwardly in axial direction of said shock absorber and proivded with supporting means for a wheel axle, link means arranged in a direction substantially transverse to the longitudinal axis of said shock absorber and having one of its ends universally linked to said extension and having its other end pivotally connected to said second understructure part, said rubber body when under a static load having a substantially heart-shaped cross-section and having that end thereof which has the greater diameter facing said first understructure part and engaging said clamping means.

References Cited by the Examiner
UNITED STATES PATENTS

| | | | |
|---|---|---|---|
| 347,281 | 8/1886 | Vose | 267—33 |
| 2,624,592 | 1/1953 | Mac Pherson | 280—96.2 |
| 2,755,056 | 7/1956 | Hutton | 267—63 |
| 2,794,661 | 6/1957 | Sears | 287—85 |
| 3,037,787 | 6/1962 | Gottschald | 280—96.2 |

ARTHUR L. LA POINT, *Primary Examiner.*

W. B. WILBUR, R. WOHLFARTH, *Assistant Examiners.*